US009800488B2

(12) United States Patent
Liu et al.

(10) Patent No.: US 9,800,488 B2
(45) Date of Patent: Oct. 24, 2017

(54) METHOD FOR SETTING HEARTBEAT TIMER, TERMINAL AND SERVER

(71) Applicant: CHINA UNITED NETWORK COMMUNICATIONS GROUP COMPANY LIMITED, Beijing (CN)

(72) Inventors: Chengming Liu, Beijing (CN); Binfeng Yan, Beijing (CN); Chengyan Zhang, Beijing (CN); Jianshu Qiu, Beijing (CN); Xinxue Tian, Beijing (CN)

(73) Assignee: CHINA UNITED NETWORK COMMUNICATIONS GROUP COMPANY LIMITED, Beijing (CN)

( * ) Notice: Subject to any disclaimer, the term of this patent is extended or adjusted under 35 U.S.C. 154(b) by 179 days.

(21) Appl. No.: 14/824,755

(22) Filed: Aug. 12, 2015

(65) Prior Publication Data

US 2016/0050134 A1   Feb. 18, 2016

(30) Foreign Application Priority Data

Aug. 12, 2014 (CN) .......................... 2014 1 0392468

(51) Int. Cl.
*H04L 12/26* (2006.01)
*H04L 12/24* (2006.01)

(52) U.S. Cl.
CPC .......... *H04L 43/10* (2013.01); *H04L 41/0833* (2013.01)

(58) Field of Classification Search
CPC ..... H04L 47/10; H04L 43/50; H04L 12/2697; H04L 43/0852; H04L 43/00
See application file for complete search history.

(56) References Cited

U.S. PATENT DOCUMENTS 7,302,370 B2 * 11/2007 Nickerson ......... G06F 17/30899
                                                           703/6
8,762,546 B2 *  6/2014 Ralph ..................... H04L 43/10
                                                           709/203

(Continued)

FOREIGN PATENT DOCUMENTS

CN       101466092 A     6/2009
CN       101471992 A     7/2009

(Continued)

OTHER PUBLICATIONS

Australian Patent Examination Report No. 1 of corresponding Australia patent application No. 2015213307, dated Dec. 23, 2015.

(Continued)

*Primary Examiner* — Mark Rinehart
*Assistant Examiner* — Sanjay K Dewan
(74) *Attorney, Agent, or Firm* — J.C. Patents

(57) ABSTRACT

The present invention provides a method for setting a heartbeat timer, a terminal and a server. The method includes: a terminal installed with an application receives a timer setting request carrying first setting information of a to-be-set timer transmitted by the application; the terminal transmits a timer query request to a server according to the first setting information; the timer query request carries a query identifier generated according to the first setting information; the terminal receives a timer query response returned by the server, where the timer query response carries a query result indicating whether a heartbeat timer list includes a heartbeat timer information entry matched with the query identifier; the terminal determines whether to set the to-be-set timer for the application according to the query result, and performs a corresponding setting operation. The solution can effectively manage and set a heartbeat timer within a mobile phone terminal.

16 Claims, 3 Drawing Sheets

(56) References Cited

U.S. PATENT DOCUMENTS

| | | | |
|---|---|---|---|
| 9,271,325 B2* | 2/2016 | Backholm | H04W 76/045 |
| 2006/0107284 A1* | 5/2006 | Crawford | G06F 11/1484 |
| | | | 725/25 |
| 2008/0120177 A1* | 5/2008 | Moscirella | G06F 11/2023 |
| | | | 705/14.12 |
| 2012/0079586 A1 | 3/2012 | Brown et al. | 726/16 |
| 2013/0067059 A1 | 3/2013 | Gatta et al. | 709/224 |
| 2013/0173756 A1* | 7/2013 | Luna | H04L 43/0876 |
| | | | 709/219 |
| 2013/0322456 A1* | 12/2013 | Ito | H04L 7/04 |
| | | | 370/400 |
| 2013/0332589 A1* | 12/2013 | Zhong | G06F 9/46 |
| | | | 709/223 |
| 2014/0112111 A1 | 4/2014 | Zhu et al. | 368/250 |
| 2014/0143575 A1* | 5/2014 | Ansley | H04W 52/0235 |
| | | | 713/323 |
| 2014/0321448 A1* | 10/2014 | Backholm | H04L 43/10 |
| | | | 370/338 |

FOREIGN PATENT DOCUMENTS

| | | |
|---|---|---|
| CN | 103118188 A | 5/2013 |
| CN | 103731910 A | 4/2014 |
| CN | 103888948 A | 6/2014 |

OTHER PUBLICATIONS

Chinese First Examination Report of corresponding China patent application No. 201410392468.X, dated Dec. 1, 2015.

* cited by examiner

METHOD FOR SETTING HEARTBEAT TIMER, TERMINAL AND SERVER

CROSS-REFERENCE TO RELATED APPLICATION

This application claims priority to Chinese Patent Application No. 201410392468.X, filed on Aug. 12, 2014, which is incorporated herein by reference in its entirety.

TECHNICAL FIELD

The present invention relates to communication technologies and, in particular, to a method for setting a heartbeat timer, a terminal, and a server.

BACKGROUND

In an existing mobile internet, a number of applications need to remain in an online state for a long time. This requires that an application in a mobile terminal should unceasingly detect network connections even without data transmission, and transmit heartbeat information to a corresponding application server through a timed heartbeat reminder of a timer provided in the terminal so as to remain in the online state. However, at present, there is also a phenomenon that such heartbeat mechanism is abused. For instance, some applications may use the heartbeat mechanism to realize real-time content updating (for example, a news application or a forum application), but the user may do not really need these updated contents; moreover, in order to push information such as advertising to the user, some applications also maintain connections between a terminal and a server through setting heartbeats, however, the user may be not interested in these information or even may detest these information.

These unnecessary "heartbeats" for the user listed above will incur a lot of problems: for instance, power consumption of a mobile phone increases; excessive phone memory is occupied; and transmitting heartbeat information by a terminal causes waste of data traffic, and etc. Thus, how to effectively manage and set the heartbeat timer within the mobile phone terminal becomes an urgent problem.

SUMMARY

The present invention provides a method for setting a heartbeat timer, a terminal and a server, which are used to solve technical problems that are incurred due to transmitting of these heartbeat information to a network side after an unnecessary heartbeat timer is set in the prior art, the technical problems may be that power consumption of a mobile phone increases, or excessive phone memory is occupied, or transmitting heartbeat information by a terminal causes waste of data traffic, etc, since the heartbeat timer within the mobile phone terminal cannot be effectively manage and set in the prior art, these problems cannot be reduced or avoided.

In a first aspect, embodiments of the present invention provide a method for setting a heartbeat timer, including:
receiving, by a terminal installed with an application, a timer setting request transmitted by the application, where the timer setting request carries first setting information of a to-be-set timer;
transmitting, by the terminal, a timer query request to a server according to the first setting information, where the timer query request carries a query identifier generated according to the first setting information;
receiving, by the terminal, a timer query response returned by the server, where the timer query response carries a query result indicating whether a heartbeat timer information entry matched with the query identifier is included in a heartbeat timer list as queried by the server according to the query identifier; and
determining, by the terminal, whether to set the to-be-set timer for the application according to the query result, and performing a corresponding setting operation.

In a second aspect, embodiments of the present invention provide another method for setting a heartbeat timer, including:
receiving, by a server, a timer query request transmitted by a terminal, where the timer query request carries a query identifier generated by the terminal according to first setting information of a to-be-set timer carried in a timer setting request after receiving the timer setting request transmitted by an application in the terminal;
querying, by the server, whether a heartbeat timer information entry matched with the query identifier is included in a heartbeat timer list according to the query identifier; and
transmitting, by the server, a timer query response to the terminal, where the timer query response carries a query result indicating whether the heartbeat timer information entry matched with the query identifier is included in the heartbeat timer list as queried by the server according to the query identifier, so as to enable the terminal to determine whether to set the to-be-set timer for the application according to the query result.

In a third aspect, embodiments of the present invention provide a terminal, including:
a receiving module, configured to receive a timer setting request transmitted by an application in a terminal, where the timer setting request carries first setting information of a to-be-set timer;
a transmitting module, configured to transmit a timer query request to a server according to the first setting information, where the timer query request carries a query identifier generated according to the first setting information;
the receiving module is further configured to receive a timer query response returned by the server, where the timer query response carries a query result indicating whether a heartbeat timer information entry matched with the query identifier is included in a heartbeat timer list as queried by the server according to the query identifier; and
a processing module, configured to determine whether to set the to-be-set timer for the application according to the query result, and perform a corresponding setting operation.

In a fourth aspect, embodiments of the present invention provide a server, including:
a receiving module, configured to receive a timer query request transmitted by a terminal, where the timer query request carries a query identifier generated by the terminal according to first setting information of a to-be-set timer carried in a timer setting request after receiving the timer setting request transmitted by an application in the terminal;
a processing module, configured to query whether a heartbeat timer information entry matched with the query identifier is included in a heartbeat timer list according to the query identifier; and
a transmitting module, configured to transmit a timer query response to the terminal, where the timer query response carries a query result indicating whether the heartbeat timer information entry matched with the query identifier is included in the heartbeat timer list as queried by the processing module according to the query identifier, so as to enable the terminal to determine whether to set the to-be-set timer for the application according to the query result.

According to a method for setting a heartbeat timer, a terminal and a server provided in embodiments of the present invention, a terminal installed with an application receives a timer setting request transmitted by the application, where the timer setting request carries first setting information of a to-be-set timer; the terminal transmits a timer query request to a server according to the first setting information, where the timer query request carries a query identifier generated according to the first setting information; the terminal receives a timer query response returned by the server, where the timer query response carries a query result indicating whether a heartbeat timer information entry matched with the query identifier is included in a heartbeat timer list as queried by the server according to the query identifier; and the terminal determines whether to set the to-be-set timer for the application according to the query result, and performs a corresponding setting operation. This solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

DESCRIPTION OF EMBODIMENTS

Figure 1:
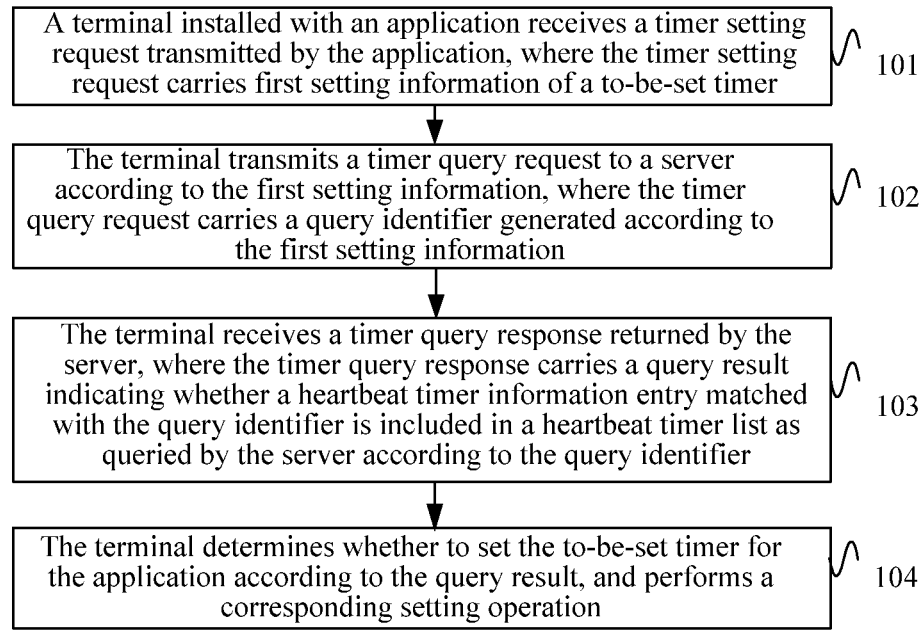
FIG. 1 is a flow chart of a method for setting a heartbeat timer according to an embodiment of the present invention.

FIG. 1 is a flow chart of a method for setting a heartbeat timer according to an embodiment of the present invention. An entity executing the following steps of the method may be a terminal equipment such as a mobile phone or an iPad installed with a network application, or a module or a chip integrated in the terminal equipment. As shown in FIG. 1, the method for setting a heartbeat timer specifically includes:

S101, a terminal installed with an application receives a timer setting request transmitted by the application, where the timer setting request carries first setting information of a to-be-set timer;

In order to achieve permanent online and push (PUSH) functions, a great number of mobile network services in an existing mobile terminal require an application client to maintain a long connection to a server, so that the server can transmit a message to a terminal in time. The application client is referred to as "an application", which may be specifically a client used in the terminal, such as QQ, WeChat and Renren. In the prior art, a timed reminder mechanism is used to ensure that the long connection is maintained between the client and the server, specifically, a timer setting module is integrated in the mobile terminal, each time when an application is initiated within the terminal, the timer setting module will receive a timer setting request transmitted by the application, where the timer setting request carries first setting information of a to-be-set timer corresponding to the application, so as to request the timer setting module to set a timer for the application according to specific contents in the first setting information, thereby notifying the application to perform a corresponding triggering operation when a specified time point arrives, for instance, transmitting heartbeat information to a designated server. In this embodiment, take a heartbeat timer as an example of the to-be-set timer in the timer setting request transmitted by the application, and the first setting information may specifically include: application name information, a reminder type (single time, periodic, etc.), reminder interval (reminder period length for a periodic reminder), and a triggering reminder parameter (i.e., a triggering operation identifier, for example, a server address corresponding to the transmitting of the heartbeat information to the designated server, etc.).

S102, the terminal transmits a timer query request to a server according to the first setting information, where the timer query request carries a query identifier generated according to the first setting information;

Currently, many timers which are set by some applications in the terminal are unnecessary for a user (in particular, heartbeat timers corresponding to some network applications), for instance, some network applications may use a heartbeat mechanism to realize real-time content updating (for example, a news application or a forum application), but the user may do not really need these updated contents; moreover, in order to push information such as advertising to the user, some network applications also maintain a connection between the terminal and the server through setting heartbeats, however, the user may be not interested in these information or even may detest these information. All these heartbeat timers are that the user does not want to set.

In this embodiment, for a timer corresponding to a non-network application (such as an alarm clock) that has been set in the terminal, if a timer setting module in the terminal can identify a heartbeat timer that is not used by a network application according to the first setting information corresponding the timer, then the timer does not serve as an object for which an judgment of whether it is a necessary timer should be made, and may be set directly. For a heartbeat timer setting request that has been determined to be corresponding to a network application, or a timer setting request that cannot be identified whether it corresponds to a non-network application, the terminal may transmit a timer query request to a server according to the first setting information.

Specifically, the terminal may perform a calculation on the first setting information according to a certain algorithm firstly, and generate a corresponding query identifier, where the query identifier may be data in a form of a string and etc; then, the terminal transmits the timer query request carrying the query identifier to the server, so as to learn from the server side whether the timer is a heartbeat timer and a history situation regarding settings of the heartbeat timer in other terminals, thereby assisting the timer setting module in the terminal in determining whether to set the timer. The server may pre-store information related to history setting situations regarding settings of heartbeat timers corresponding to various network applications in other terminals, that is, a heartbeat timer information entry. For instance, the heartbeat timer information entry specifically includes the number of times that a heartbeat timer corresponding to a certain network application has been requested to be set in terminals and the number of times that a heartbeat timer corresponding to a certain network application has been prevented to be set by terminals.

S103, the terminal receives a timer query response returned by the server, where the timer query response carries a query result indicating whether a heartbeat timer information entry matched with the query identifier is included in a heartbeat timer list as queried by the server according to the query identifier;

After the terminal transmits the timer query request to the server, the server queries whether a heartbeat timer information entry matched with the query identifier is included in a local heartbeat timer list according to the query identifier in the timer query request.

Specifically, the server may pre-increase a corresponding timer identifier in each heartbeat timer information entry, where the timer identifier is generated in a same manner as that of the query identifier, which is generated after performing a calculation on first setting information of a timer in each heartbeat timer information entry by using a same algorithm. It may be understood that, if the query identifier and the timer identifier corresponding to the heartbeat timer information entry match the same, then it indicates that the first setting information corresponding to the timer to be queried is the same as the first setting information in the heartbeat timer information entry, thus it can be inferred that the to-be-set timer and the heartbeat timer in the heartbeat timer information entry matched the same. Or, specifically, the server may also directly restore first setting information of the to-be-set timer according to the query identifier; and then compare whether the first setting information is the same as the first setting information of the heartbeat timer in each heartbeat timer information entry, and thus it can be inferred whether the to-be-set timer and the heartbeat timer in the heartbeat timer information entry match the same. In the two cases, if it is inferred that the to-be-set timer and the heartbeat timer in the heartbeat timer information entry match the same, then it is determined that the query identifier is matched with the heartbeat timer information entry.

After the server queries in the heartbeat timer list according to the above method whether the heartbeat timer information entry matched with the query identifier is included, the query result is carried in a timer query response and transmitted to the terminal.

S104, the terminal determines whether to set the to-be-set timer for the application according to the query result, and performs a corresponding setting operation.

The terminal learns whether the application corresponding to the to-be-set timer is a network application and a situation regarding settings of the timer in other terminals as requested, according to the query result indicating whether the heartbeat timer information entry matched with the query identifier is included in a heartbeat timer list as queried by the server according to the query identifier, where the query result is carried in the timer query response returned by the server, thereby determining whether to set the to-be-set timer for the application, and performing a corresponding operation process related to setting the timer or not setting the timer. For instance, if the query result shows that the to-be-set timer is a heartbeat timer, and it is determined from history situation information regarding settings of the heartbeat timer in other terminals, the timer is set in other terminals for many times or the times of setting exceeds a certain proportion, then it may be conceived that, after the timer is triggered, corresponding network operations are received by most users, the timer is a useful timer for the users, then, the terminal may instruct the timer setting module to set the timer.

According to the method for setting a heartbeat timer provided in the present invention, a terminal installed with an application receives a timer setting request transmitted by the application, where the timer setting request carries first setting information of a to-be-set timer; the terminal transmits a timer query request to a server according to the first setting information, where the timer query request carries a query identifier generated according to the first setting information; the terminal receives a timer query response returned by the server, where the timer query response carries a query result indicating whether a heartbeat timer information entry matched with the query identifier is included in a heartbeat timer list as queried by the server according to the query identifier; and the terminal determines whether to set the to-be-set timer for the application according to the query result, and performs a corresponding setting operation. The solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

Figure 2:
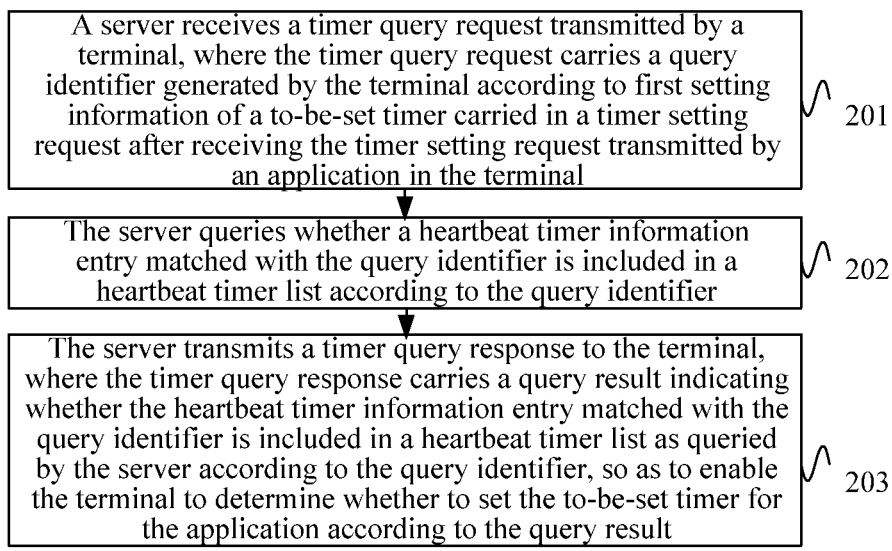
FIG. 2 is a flow chart of a method for setting a heartbeat timer according to another embodiment of the present invention.

FIG. 2 is a flow chart of a method for setting a heartbeat timer according to another embodiment of the present invention. An entity executing the following steps of the method may be a server provided in a network, or a module or a chip integrated in the server. As shown in FIG. 2, the method for setting the heartbeat timer specifically includes:

S201, a server receives a timer query request transmitted by a terminal, where the timer query request carries a query identifier generated by the terminal according to first setting information of a to-be-set timer carried in a timer setting request after receiving the timer setting request transmitted by an application in the terminal;

After being initiated, an application preset in a terminal will transmit a timer setting request to a terminal system so as to request the terminal to set a corresponding timer for the application via a timer setting module; for the specific process, reference may be made to corresponding contents in step 101.

Currently, many timers which are set by some applications in the terminal are unnecessary for a user (in particular, heartbeat timers corresponding to some network applications), for instance, some network applications may use a heartbeat mechanism to realize real-time content updating (for example, a news application or a forum application), but the user may do not really need these updated contents; moreover, in order to push information such as advertising to the user, some network applications also maintain a connection between the terminal and the server through setting heartbeats, however, the user may be not interested in these information or even may detest these information. All these heartbeat timers are that the user does not want to set.

In this embodiment, for a timer corresponding to a non-network application (such as an alarm clock) that has been set in the terminal, if a timer setting module in the terminal can identify a heartbeat timer that is not used by a network application according to the first setting information corresponding the timer, then the timer does not serve as an object for which an judgment of whether it is a necessary timer should be made, and may be set directly. For a heartbeat timer setting request that has been determined to be corresponding to a network application, or a timer setting request that cannot be identified whether it corresponds to a non-network application, the terminal may transmit a timer query request to a server according to the first setting information.

Specifically, the terminal may perform a calculation on the first setting information according to a certain algorithm firstly, and generate a corresponding query identifier, where the query identifier may be data in a form of a string and etc; then, the terminal transmits the timer query request carrying the query identifier to the server, so as to learn from the server side whether the timer is a heartbeat timer and a history situation regarding settings of the heartbeat timer in other terminals, thereby assisting the timer setting module in the terminal in determining whether to set the timer. The server may pre-store information related to history setting situations regarding settings of heartbeat timers corresponding to various network applications in other terminals, that is, a heartbeat timer information entry. For instance, the heartbeat timer information entry specifically includes the number of times that a heartbeat timer corresponding to a certain network application has been requested to be set in terminals and the number of times that a heartbeat timer corresponding to a certain network application has been prevented to be set by terminals.

S202, the server queries whether a heartbeat timer information entry matched with the query identifier is included in a heartbeat timer list according to the query identifier;

Specifically, the server may pre-increase a corresponding timer identifier in each heartbeat timer information entry, where the timer identifier is generated in a same manner as that of the query identifier, which is generated after performing a calculation on second setting information of a timer in each heartbeat timer information entry by using a same algorithm. It may be understood that, if the query identifier and the timer identifier corresponding to the heartbeat timer information entry match the same, then it indicates that the above first setting information is the same as the second setting information, thus it can be inferred that the to-be-set timer and a timer in the heartbeat timer information entry match the same. Or, specifically, the server may also directly restore first setting information of the to-be-set timer according to the query identifier; and then compare whether the first setting information is the same as the second setting information of a timer in each heartbeat timer information entry, and thus it can be inferred whether the to-be-set timer and the timer in the heartbeat timer information entry match the same. In the two cases, if it is inferred that the to-be-set timer and the timer in the heartbeat timer information entry match the same, then it is determined that the query identifier is matched with the heartbeat timer information entry.

S203, the server transmits a timer query response to the terminal, where the timer query response carries a query result indicating whether the heartbeat timer information entry matched with the query identifier is included in a heartbeat timer list as queried by the server according to the query identifier, so as to enable the terminal to determine whether to set the to-be-set timer for the application according to the query result.

After the server queries in the heartbeat timer list according to the above method whether the heartbeat timer information entry matched with the query identifier is included, the query result is carried in a timer query response and transmitted to the terminal. The terminal determines whether the application corresponding to the to-be-set timer is a network application and a situation regarding settings of the timer in other terminals as requested according to the query result, thereby determining whether to set the to-be-set timer for the application, and performing a corresponding operation process related to setting the timer or not setting the timer. For instance, if the query result shows that the to-be-set timer is a heartbeat timer, and it is determined from history situation information regarding settings of the heartbeat timer in other terminals, the timer is set in other terminals for many times or the times of setting exceeds a certain proportion, then it may be conceived that, after the timer is triggered, corresponding network operations are received by most users, the timer is a useful timer for the users, then, the terminal may instruct the timer setting module to set the timer.

According to the method for setting a heartbeat timer provided in the present invention, a server receives a timer query request transmitted by a terminal, where the timer query request carries a query identifier generated by the terminal according to first setting information of a to-be-set timer carried in a timer setting request after receiving the timer setting request transmitted by an application in the terminal; the server queries whether a heartbeat timer information entry matched with the query identifier is included in a heartbeat timer list according to the query identifier; and the server transmits a timer query response to the terminal, where the timer query response carries a query result indicating whether a heartbeat timer information entry matched with the query identifier is included in a heartbeat timer list as queried by the server according to the query identifier, so as to enable the terminal to determine whether to set the to-be-set timer for the application according to the query result. The solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

Figure 3:
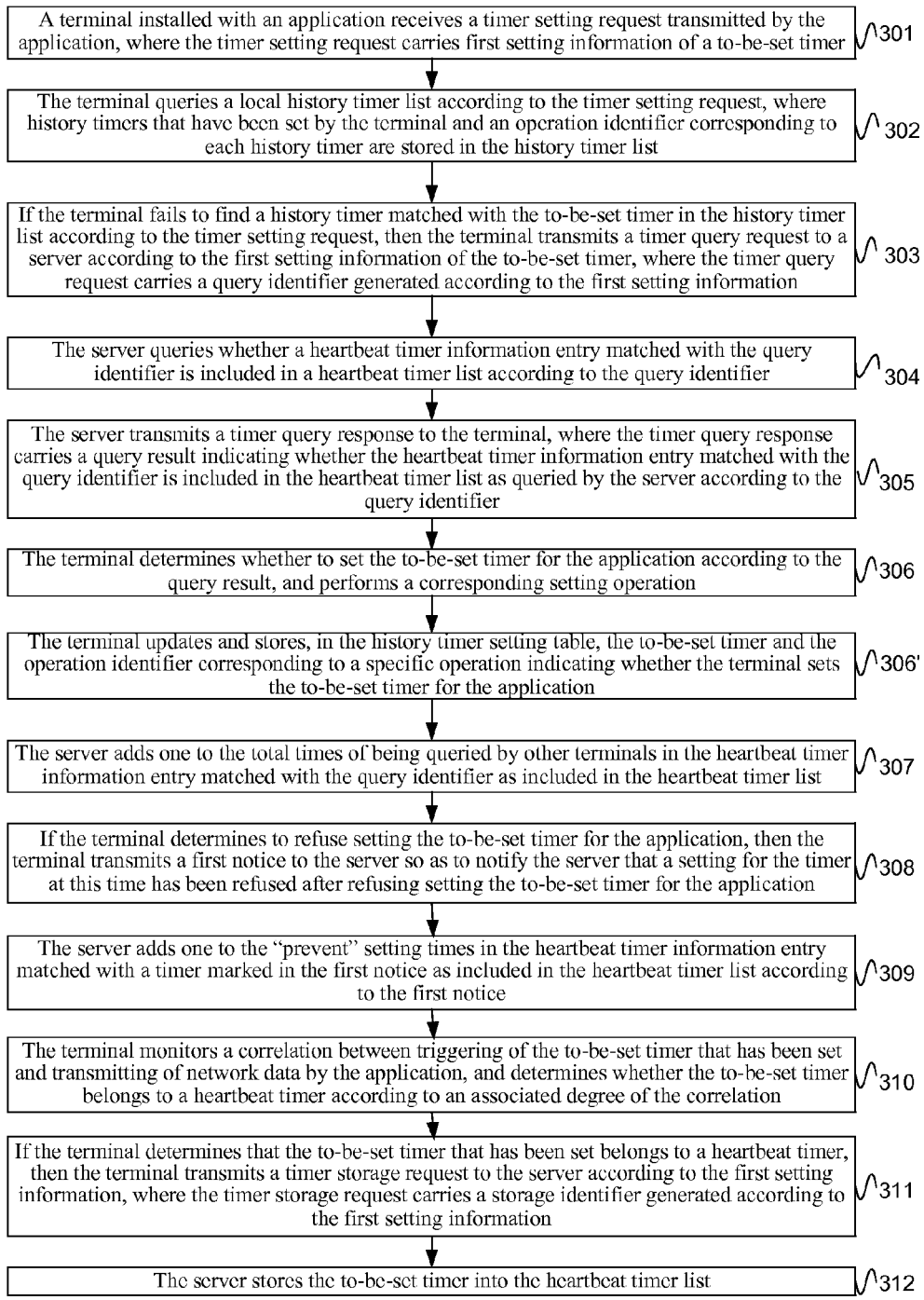
FIG. 3 is a flow chart of a method for setting a heartbeat timer according to still another embodiment of the present invention.

FIG. 3 is a flow chart of a method for setting a heartbeat timer according to still another embodiment of the present invention, which is a specific implementation of the method for setting the heartbeat timer as shown in FIG. 1 and FIG. 2. Entities executing the following steps of the method relate to the terminal device and the server described above. As shown in FIG. 3, the method for setting the heartbeat timer specifically includes:

S301, a terminal installed with an application receives a timer setting request transmitted by the application, where the timer setting request carries first setting information of a to-be-set timer; for a specific implementation of this step, reference may be made to corresponding contents in step 101.

S302, the terminal queries a local history timer list according to the timer setting request, where history timers that have been set by the terminal and an operation identifier corresponding to each history timer are stored in the history timer list;

In this embodiment, a history timer list is preset in a local storage module in the terminal. Each time after processing the timer setting request transmitted by the application in the terminal, the terminal will record setting information (a specific format of the information is the same as that of the above first setting information) of the timer and an operation identifier ("allow setting" or "refuse setting") indicating whether the terminal has set the timer for the application finally, and store them into the history timer list. The recorded timer is a heartbeat timer corresponding to a network application. Thus, each time after receiving the timer setting request transmitted by the application in the terminal, the terminal may firstly query whether the history timer list includes the setting information that is the same as the first setting information in the timer setting request, thereby determining whether to set the to-be-set timer for the application with reference to an operation behavior indicated by a corresponding operation identifier in the history timer.

S303, if the terminal fails to find a history timer matched with the to-be-set timer in the history timer list according to the timer setting request, then the terminal transmits a timer query request to a server according to the first setting information of the to-be-set timer, where the timer query request carries a query identifier generated according to the first setting information;

If the terminal fails to find a history timer matched with the to-be-set timer in the history timer list according to the first setting information in the timer setting request, then it indicates that the to-be-set timer currently requested to be set initiates a request in the terminal for the first time, and there is no history setting record. In this case, the terminal may transmit a timer query request to a server according to the first setting information of the to-be-set timer, where the timer query request carries a query identifier generated according to the first setting information. Specifically, reference may be made to corresponding contents in step 102 for the transmitting process.

If a history timer matched with the to-be-set timer is found by the terminal in the history timer list according to the first setting information in the timer setting request, then it indicates that the to-be-set timer currently requested to be set has been requested to be set, and there is a history setting record. In this case, the terminal may determine whether to set the to-be-set timer for the application according to the operation identifier that is stored correspondingly to the timer in the history timer list, and perform a corresponding setting operation. For instance, when the operation identifier shows "allow setting", the terminal may set the timer according to the first setting information corresponding to the to-be-set timer; or, when the operation identifier shows "refuse setting", the terminal may ignore the timer setting request transmitted by the application to refuse setting the to-be-set timer for the application.

S304, the server queries whether a heartbeat timer information entry matched with the query identifier is included in a heartbeat timer list according to the query identifier; for a specific implementation of this step, reference may be made to corresponding contents in step 202.

Specifically, this embodiment provides a specific implementation of step 304:

In the heartbeat timer list, each heartbeat timer information entry specifically includes an application name and a matched string set corresponding to a timer, and each of the matched string sets consists of at least one matched string; where an original matched string set only includes one original matched string, and the original matched string may be generated by the server by performing a calculation on the first setting information corresponding to each heartbeat timer according to a preset algorithm; when being updated and replaced constantly, then the original matched string becomes a matched string set including at least one matched string; each matched string is a subset of the original matched string; reference may be made to the following contents (steps 311~312) for a specific updating and replacing process.

When querying in the heartbeat timer list according to the query identifier whether a heartbeat timer information entry matched with the query identifier is included, the server may firstly perform a restoration and resolution to the query identifier to acquire the first setting information of the to-be-set timer corresponding to the query identifier; the specific process of restoration and resolution and the operation process of generating the query identifier are processes opposite to each other.

The server queries whether a heartbeat timer information entry for a same application corresponding to the first setting information is included in the heartbeat timer list according to the application name included in each heartbeat timer information entry; specifically, after acquiring the first setting information through the restoration and resolution process, the server may acquire an application name of an application to which a corresponding timer belongs as included in the first setting information; the server queries whether there is a heartbeat timer information entry including the application name in the heartbeat timer list according to the application name, thereby determining whether the heartbeat timer list includes the heartbeat timer information entry for the same application corresponding to the first setting information.

If the heartbeat timer list includes the heartbeat timer information entry for the same application corresponding to the first setting information, then the server performs a calculation on the first setting information according to a preset algorithm to generate a first string.

The server determines the matched string set included in the heartbeat timer information entry for the same application corresponding to the first setting information in the heartbeat timer list as a first matched string set, and compares each matched string included in the first matched string set with the first string;

If the matched strings included in the first matched string set are included in the first string in sequential order, then the server determines the heartbeat timer information entry corresponding to the first matched string set as the heartbeat timer information entry matched with the query identifier.

The sequential order described above is a sequential order of the matched strings included in each matched string set in a corresponding original matched string ("sequential order" mentioned in the present application document are all interpreted by this definition). For instance, the first string is "aaaazstbbbbewrgefcccc"; the matched string set arranged in the sequential order includes three strings, respectively are "aaaa", "bbbb" and "cccc"; since the three matched strings included in the first matched string set are included in the first string "aaaazstbbbbewrgefcccc" in sequential order, thus the server determines the heartbeat timer information entry corresponding to the first matched string set as the heartbeat timer information entry matched with the query identifier.

In further, each heartbeat timer information entry in the heartbeat timer list also specifically includes total times that the timer corresponding to the heartbeat timer information entry has been queried by other terminals, and "prevent" setting times. Specifically, each time after receiving the timer query request transmitted by the terminal, the server will perform query and statistic to the heartbeat timer information entry corresponding to the first setting information included in the query request as found in the heartbeat timer list, including total times that the timer corresponding to the heartbeat timer information entry has been queried by other terminals, and the "prevent" setting times. The total times is obtained after making statistic to the number of times that a terminal transmits a timer query request by the server; the "prevent" setting times is obtained by the server by performing track statistic to specific implementation operations whether a terminal correspondingly sets the timer after the server receives the timer query request transmitted by the terminal.

S305, the server transmits a timer query response to the terminal, where the timer query response carries a query result indicating whether the heartbeat timer information entry matched with the query identifier is included in the heartbeat timer list as queried by the server according to the query identifier; for a specific implementation of this step, reference may be made to corresponding contents in step 203.

Specifically, when each heartbeat timer information entry in the heartbeat timer list also specifically includes total times that the timer corresponding to the heartbeat timer information entry has been queried by other terminals, and the "prevent" setting times; then, if the heartbeat timer information entry matched with the query identifier is found by the server in the heartbeat timer list according to the query identifier, then the query result includes the total times that the heartbeat timer information entry matched with the query identifier has been queried by other terminals, and the "prevent" setting times.

if the server fails to find the heartbeat timer information entry matched with the query identifier in the heartbeat timer list according to the query identifier, then the query result is null.

S306, the terminal determines whether to set the to-be-set timer for the application according to the query result, and performs a corresponding setting operation; for a specific implementation of this step, reference may be made to corresponding contents in step 104.

Specifically, if the server finds the heartbeat timer information entry matched with the query identifier in the heartbeat timer list according to the query identifier, then step 306 may further include:

The terminal displays the query result to a user; specifically, after receiving the query result returned by the server, the terminal may remind the user of inputting a setting instruction indicating whether to set the to-be-set timer through to a display screen by means of texts, voice, etc.;

The terminal receives an "allow" setting instruction input by the user, and determines to set the to-be-set timer for the application according to the first setting information; or, the terminal receives a "refuse" setting instruction input by the user, and determines to refuse setting the to-be-set timer for the application.

S306', the terminal updates and stores, in the history timer setting table, the to-be-set timer and the operation identifier corresponding to a specific operation indicating whether the terminal sets the to-be-set timer for the application;

Each time after processing the timer setting request transmitted by the application in the terminal, the terminal will record setting information (a specific format of the information is the same as that of the above first setting information) of the timer and an operation identifier ("allow setting" or "refuse setting") indicating whether the terminal has set the timer for the application finally, and store them into the history timer list, so that when the terminal receives the same timer setting request again in the future, the terminal may firstly look for whether the history timer list includes the setting information that is the same as the first setting information in the timer setting request, thereby determining whether to set the to-be-set timer for the application with reference to an operation behavior indicated by a corresponding operation identifier in the history timer.

Specifically, in this embodiment, when the query result shows that the heartbeat timer list includes the heartbeat timer information entry matched with the query identifier, the terminal may update and store, in the history timer setting table, the corresponding to-be-set timer and the operation identifier corresponding to the specific operation indicating whether the terminal sets the to-be-set timer for the application.

In further, if the query result shows that the heartbeat timer list includes the heartbeat timer information entry matched with the query identifier, then after the terminal determines whether to set the to-be-set timer for the application according to the query result, and performs the corresponding setting operation, further including the following steps (S307~309).

S307, the server adds one to the total times of being queried by other terminals in the heartbeat timer information entry matched with the query identifier as included in the heartbeat timer list.

S308, if the terminal determines to refuse setting the to-be-set timer for the application, then the terminal transmits a first notice to the server so as to notify the server that a setting for the timer at this time has been refused after refusing setting the to-be-set timer for the application, where the first notice may specifically carry identification information which may uniquely identify the to-be-set timer and identify that the terminal has refused setting the to-be-set timer, such as the first setting information corresponding to the to-be-set timer.

S309, the server adds one to the "prevent" setting times in the heartbeat timer information entry matched with a timer marked in the first notice as included in the heartbeat timer list according to the first notice.

In further, if the query result shows that the heartbeat timer list does not include the heartbeat timer information entry matched with the query identifier, after the terminal determines to set the to-be-set timer for the application according to the query result and performs the corresponding setting operation, further including the following steps (S310~312).

S310, the terminal monitors a correlation between triggering of the to-be-set timer that has been set and transmitting of network data by the application, and determines whether the to-be-set timer belongs to a heartbeat timer according to an associated degree of the correlation;

Specifically, during a process that a timer setting module in the terminal performs a timer reminder operation specified by the to-be-set timer, the terminal may detect a correlation between triggering of the to-be-set timer and transmitting of network data by the application via a special detection module or device, and determine whether a corresponding application will be initiated to transmit network data to a network side each time when the to-be-set timer is triggered; and determine whether the to-be-set timer belongs to a heartbeat timer according to an associated degree of the correlation; in the prior art, there has been a method and a technique for detecting a heartbeat timer, which will not be repeated herein.

S311, if the terminal determines that the to-be-set timer that has been set belongs to a heartbeat timer, then the terminal transmits a timer storage request to the server according to the first setting information, where the timer storage request carries a storage identifier generated according to the first setting information;

S312, the server stores the to-be-set timer into the heartbeat timer list, so as to provide reference for setting when other terminals transmit a query request for a same heartbeat timer entry in the future.

Specifically, a specific implementation of this step includes:

The server performs a restoration and resolution to the storage identifier to acquire the first setting information of the to-be-set timer corresponding to the storage identifier, where a process for generating the storage identifier according to the first setting information is basically the same as the process for generating the query identifier according to the first setting information, only differing in that the query identifier carries an execution tag for the server to perform a query operation according to the query identifier, such as digit 1; while the storage identifier carries an execution tag for the server to perform a storage operation according to the storage identifier, such as digit 0.

The server performs a calculation on the first setting information according to the preset algorithm to generate the first string; the server queries whether a heartbeat timer information entry for a same application corresponding to the first setting information is included in the heartbeat timer list according to the application name included in each heartbeat timer information entry; for a specific implantation of this step, reference may be made to the foregoing related contents, which will not be repeated herein.

If the heartbeat timer list includes the heartbeat timer information entry for the same application corresponding to the first setting information, then the server determines the matched string set included in the heartbeat timer information entry for the same application corresponding to the first setting information in the heartbeat timer list as a second matched string set, and combines all matched strings included in the second matched string set in sequential order to form a second matched string, during the combination, a special character is inserted between any two strings, where the character is a character which will not occur in any one of the first strings, such as a character having an ASCII value of 1, for ease of descriptions hereunder, $ will be used to refer to this special character. Compare the second matched string with a first string; extract at least one common string having a sequential relationship which exists between the second matched string and the first string, and determine a string set including the at least one common string having the sequential relationship as a matched string set, and is updated as a matched string set included in the heartbeat timer information entry for the same application corresponding to the first setting information in the heartbeat timer list; where, the sequential order mentioned in the process of combining all matched strings included in the second matched string set in sequential order to form the second matched string is the same as the in sequential order mentioned above, both of which observe the in sequential order of these strings when an original matched string set is formed. For instance, when the first string is "aaaaazst-bbbbewrgefcccc", the second matched string set includes four strings, respectively are "aaa", "bbb", "ccc" and "ddd", then the combined second matched string is "aaa$bbb$cc$ddd", compare the first string with the second matched string, three common strings having sequential order are extracted, which are specifically "aaa", "bbb" and "ccc"; these three strings are maintained in sequential order and combined into a matched string set, and are updated as a new matched string set to be stored into the heartbeat timer information entry which is in the heartbeat timer list and for the same application corresponding to the first setting information, serving as an updated corresponding matched string set under this entry; or If the heartbeat timer list does not include the heartbeat timer information entry for the same application corresponding to the first setting information, then it indicates that the application corresponding to the first setting information does not store a heartbeat timer information entry corresponding thereto at a server side; at this time, the server may construct a new heartbeat timer information entry according to the first setting information, and store it into the heartbeat timer list to serve as a corresponding heartbeat timer information entry under the application, and the string set including the first string is regarded as a matched string set included in the new heartbeat timer information entry, that is, an original matched string set.

According to the method for setting a heartbeat timer provided in the present invention, a terminal installed with an application receives a timer setting request transmitted by the application, where the timer setting request carries first setting information of a to-be-set timer; the terminal transmits a timer query request to a server according to the first setting information, where the timer query request carries a query identifier generated according to the first setting information; the server queries whether a heartbeat timer information entry matched with the query identifier is included in a heartbeat timer list according to the query identifier; and the server transmits a timer query response to the terminal, where the timer query response carries a query result indicating whether the heartbeat timer information entry matched with the query identifier is included in the heartbeat timer list as queried by the server according to the query identifier; the terminal determines whether to set the to-be-set timer for the application according to the query result, and performs a corresponding setting operation. The solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Figure 4:
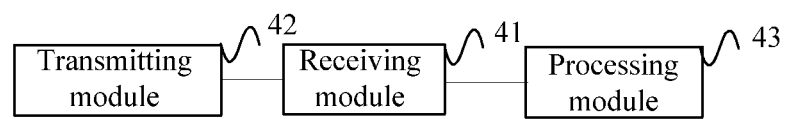
FIG. 4 is a schematic structural diagram of a terminal according to an embodiment of the present invention.

FIG. 4 is a schematic structural diagram of a terminal according to an embodiment of the present invention, the terminal may perform steps of the method as shown in FIG. 1, and the terminal includes: a receiving module 41, a transmitting module 42 and a processing module 43.

The receiving module 41 is configured to receive a timer setting request transmitted by an application in a terminal, where the timer setting request carries first setting information of a to-be-set timer;

The transmitting module 42 is configured to transmit a timer query request to a server according to the first setting information, where the timer query request carries a query identifier generated according to the first setting information;

The receiving module 41 is further configured to receive a timer query response returned by the server, where the timer query response carries a query result indicating whether a heartbeat timer information entry matched with the query identifier is included in a heartbeat timer list according to the query identifier as queried by the server;

The processing module 43 is configured to determine whether to set the to-be-set timer for the application according to the query result, and perform a corresponding setting operation.

In further, if the heartbeat timer information entry matched with the query identifier is found in the heartbeat timer list by the server according to the query identifier, then the query result received by the receiving module 41 includes total times that the heartbeat timer information entry matched with the query identifier has been queried by other terminals and "prevent" setting times;

If the heartbeat timer information entry matched with the query identifier is not found in the heartbeat timer list by the server according to the query identifier, then the query result received by the receiving module 41 is null.

In further, the processing module 43 is specifically configured to:

display the query result to a user;

receive an "allow" setting instruction input by the user, and determine to set the to-be-set timer for the application according to the first setting information; or, receive a "refuse" setting instruction input by the user, and determine to refuse setting the to-be-set timer for the application.

In further, the processing module 43 is further configured to:

if the query result shows that the heartbeat timer list includes the heartbeat timer information entry matched with the query identifier, and the processing module 43 determines to refuse setting the to-be-set timer for the application, then instruct the transmitting module 42 to transmit a first notice to the server so as to notify the server that a setting for the timer at this time has been refused, after the processing module 43 refuses setting the to-be-set timer for the application.

In further, the processing module 43 is further configured to:

if the query result shows that the heartbeat timer list does not include the heartbeat timer information entry matched with the query identifier, and after the processing module 43 determines to set the to-be-set timer for the application according to the query result and performs the corresponding setting operation, monitor a correlation between triggering of the to-be-set timer that has been set and transmitting of network data by the application, and determine whether the to-be-set timer belongs to a heartbeat timer according to an associated degree of the correlation;

if it is determined that the to-be-set timer that has been set belongs to the heartbeat timer, then the processing module 43 instructs the transmitting module 42 to transmit a timer storage request to the server according to the first setting information, where the timer storage request carries a storage identifier generated according to the first setting information, so as to enable the server to store the to-be-set timer into the heartbeat timer list.

In further, the processing module 43 is further configured to:

query a local history timer list according to the timer setting request, where history timers that have been set by the terminal and an operation identifier corresponding to each history timer are stored in the history timer list;

If a history timer matched with the to-be-set timer is found in the history timer list according to the timer setting request, then the processing module 43 determines whether to set the to-be-set timer for the application according to the operation identifier corresponding to the history timer, and performs a corresponding setting operation; or, If a history timer matched with the to-be-set timer is not found in the history timer list according to the timer setting request, the processing module 43 determines to instruct the transmitting module 42 to transmit a timer query request to the server according to the first setting information of the to-be-set timer.

In further, the processing module 43 is further configured to update and store into the history timer setting table the to-be-set timer and the operation identifier corresponding to a specific operation indicating whether the processing module 43 sets the to-be-set timer for the application.

In further, the processing module 43 is further configured to:

If the query result shows that the heartbeat timer list includes the heartbeat timer information entry matched with the query identifier, then the processing module 43 updates and stores into the history timer setting table the to-be-set timer and the operation identifier corresponding to a specific operation indicating whether the processing module 43 sets the to-be-set timer for the application.

In the embodiment as shown in FIG. 3, method steps executed by a terminal may be implemented by the terminal as shown in this embodiment, and method principles thereof are not repeated herein.

A terminal provided in the present invention receives a timer setting request transmitted by an application in a terminal, where the timer setting request carries first setting information of a to-be-set timer; transmits a timer query request to a server according to the first setting information, where the timer query request carries a query identifier generated according to the first setting information; receives a timer query response returned by the server, where the timer query response carries a query result indicating whether a heartbeat timer information entry matched with the query identifier is included in a heartbeat timer list which as queried by the server according to the query identifier; determines whether to set the to-be-set timer for the application according to the query result, and performs a corresponding setting operation. The solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

Figure 5:
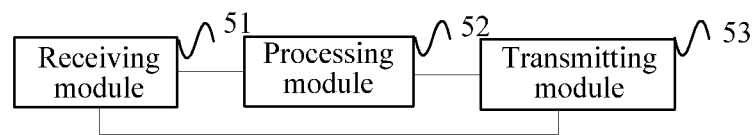
FIG. 5 is a schematic structural diagram of a server according to an embodiment of the present invention.

FIG. 5 is a schematic structural diagram of a server according to an embodiment of the present invention, the server may perform steps of the method as shown in FIG. 2, and the server includes: a receiving module 51, a processing module 52 and a transmitting module 43.

The receiving module 51 is configured to receive a timer query request transmitted by a terminal, where the timer query request carries a query identifier generated by the terminal according to first setting information of a to-be-set timer carried in a timer setting request after receiving the timer setting request transmitted by an application in the terminal;

The processing module 52 is configured to query whether a heartbeat timer information entry matched with the query identifier is included in a heartbeat timer list according to the query identifier;

The transmitting module 53 is configured to transmit a timer query response to the terminal, where the timer query response carries a query result indicating whether the heartbeat timer information entry matched with the query identifier is included in the heartbeat timer list as queried by the processing module according to the query identifier, so as to enable the terminal to determine whether to set the to-be-set timer for the application according to the query result.

In further, each heartbeat timer information entry in the heartbeat timer list specifically includes an application name and a matched string set corresponding to the timer, where the matched string set consists of at least one matched string;

the processing module 52 is further configured to:

perform a restoration and resolution to the query identifier to acquire the first setting information of the to-be-set timer corresponding to the query identifier;

query whether a heartbeat timer information entry for a same application corresponding to the first setting information is included in the heartbeat timer list according to the application name comprised in each heartbeat timer information entry;

if the heartbeat timer list includes the heartbeat timer information entry for the same application corresponding to the first setting information, then perform a calculation on the first setting information according to a preset algorithm to generate a first string;

determine a matched string set included in the heartbeat timer information entry for the same application corresponding to the first setting information in the heartbeat timer list as a first matched string set, and compare each of matched strings included in the first matched string set with the first string;

if each of the matched strings included in the first matched string set are included in the first string in sequential order, then determine a heartbeat timer information entry corresponding to the first matched string set as the heartbeat timer information entry matched with the query identifier.

In further, each heartbeat timer information entry in the heartbeat timer list also specifically includes total times that the timer corresponding to the heartbeat timer information entry has been queried by other terminals and "prevent" setting times;

if the heartbeat timer information entry matched with the query identifier is found in the heartbeat timer list by the processing module 52 according to the query identifier, then the query result includes the total times that the heartbeat timer information entry matched with the query identifier has been queried by other terminals and the "prevent" setting times;

if the heartbeat timer information entry matched with the query identifier is not found in the heartbeat timer list by the processing module 52 according to the query identifier, then the query result is null.

In further, the processing module 52 is further configured to: after the heartbeat timer information entry matched with the query identifier is found in the heartbeat timer list by the processing module 52 according to the query identifier, and instructing the transmitting module 53 to transmit the timer query response to the terminal, add one to the total times of being queried by other terminals in the heartbeat timer information entry matched with the query identifier as included in the heartbeat timer list;

In further, the receiving module 51 is further configured to receive a first notice transmitted by the terminal, and instruct the processing module 52 to add one to the "prevent" setting times of the heartbeat timer information entry matched with a timer marked in the first notice as included in the heartbeat timer list according to the first notice.

In further, the receiving module 51 is further configured to: after the heartbeat timer information entry matched with the query identifier is not found in the heartbeat timer list by the processing module 52 according to the query identifier, and the transmitting module 53 transmits the timer query response to the terminal, receive a timer storage request transmitted by the terminal according to the first setting information, where the first setting information is first setting information corresponding to the to-be-set timer which belongs to a heartbeat timer as determined by the terminal side through a local identification; and the timer storage request carries a storage identifier generated according to the first setting information;

the processing module 52 is further configured to store the to-be-set timer into the heartbeat timer list according to the storage identifier, so as to provide reference to a setting when another terminal transmits a query request for a same heartbeat timer entry in a future.

In further, the processing module 52 is further configured to:

perform a restoration and resolution to the storage identifier to acquire the first setting information of the to-be-set timer corresponding to the storage identifier; perform a calculation on the first setting information according to a preset algorithm to generate a first string;

query whether a heartbeat timer information entry for a same application corresponding to the first setting information is included in the heartbeat timer list according to the application name included in each heartbeat timer information entry;

if the heartbeat timer list includes the heartbeat timer information entry for the same application corresponding to the first setting information, then determine the matched string set included in the heartbeat timer information entry for the same application corresponding to the first setting information in the heartbeat timer list as a second matched string set, and combine all matched strings included in the second matched string set in sequential order to form a second matched string, and compare the second matched string and the first string;

extract at least one common string having a sequential relationship which exists between the second matched string and the first string that are compared, and determine a string set including the at least one common string having the sequential relationship as a matched string set, and update as a matched string set included in the heartbeat timer information entry for the same application corresponding to the first setting information in the heartbeat timer list; or, if the heartbeat timer list does not include the heartbeat timer information entry for the same application corresponding to the first setting information, then construct a new heartbeat timer information entry according to the first setting information and store the new heartbeat time information entry into the heartbeat timer list, and regard the string set including the first string as a matched string set included in the new heartbeat timer information entry, that is, an original matched string set.

In the embodiment as shown in FIG. 3, method steps executed by a server may be implemented by the server as shown in this embodiment, and method principles thereof are not repeated herein.

A server provided in the present invention receives a timer query request transmitted by a terminal, where the timer query request carries a query identifier generated by the terminal according to first setting information of a to-be-set timer carried in a timer setting request after receiving the timer setting request transmitted by an application in the terminal; queries whether a heartbeat timer information entry matched with the query identifier is included in a heartbeat timer list according to the query identifier; and transmits a timer query response to the terminal, where the timer query response carries a query result indicating whether the heartbeat timer information entry matched with the query identifier is included in the heartbeat timer list as queried by the server according to the query identifier, so as to enable the terminal to determine whether to set the to-be-set timer for the application according to the query result. The solution can achieve effective management and setting of a heartbeat timer within a mobile phone terminal, thereby reducing or avoiding problems that are incurred due to transmitting of unnecessary heartbeat information to a network side, for instance, power consumption of a mobile phone increases; excessive phone memory is occupied, and transmitting heartbeat information by a terminal causes waste of data traffic, etc.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for setting a heartbeat timer, comprising:
   receiving, by a terminal installed with an application, a timer setting request transmitted by the application, wherein the timer setting request carries first setting information of a to-be-set timer;
   transmitting, by the terminal, a timer query request to a server according to the first setting information, wherein the timer query request carries a query identifier generated according to the first setting information;
   receiving, by the terminal, a timer query response returned by the server, wherein the timer query response carries a query result indicating whether a heartbeat timer information entry matched with the query identifier is comprised in a heartbeat timer list as queried by the server according to the query identifier; and
   determining, by the terminal, whether to set the to-be-set timer for the application according to the query result, and performing a corresponding setting operation;
   wherein the determining, by the terminal, whether to set the to-be-set timer for the application comprises determining, by the terminal, whether to create the to-be-set timer for the application.

2. The method according to claim 1, wherein,
   if the heartbeat timer information entry matched with the query identifier is found in the heartbeat timer list by the server according to the query identifier, then the query result comprises total times that the heartbeat timer information entry matched with the query identifier has been queried by other terminals and "prevent" setting times;
   the determining, by the terminal, whether to set the to-be-set timer for the application according to the query result, and the performing the corresponding setting operation comprise:
   displaying, by the terminal, the query result to a user;
   receiving, by the terminal, an "allow" setting instruction input by the user, and determining to create the to-be-set timer for the application according to the first setting information; or,
   receiving, by the terminal, a "refuse" setting instruction input by the user, and determining to refuse creating the to-be-set timer for the application;
   or,
   if the heartbeat timer information entry matched with the query identifier is not found in the heartbeat timer list by the server according to the query identifier, then the query result is null.

3. The method according to claim 1, wherein, if the query result shows that the heartbeat timer list comprises the heartbeat timer information entry matched with the query identifier, then after the terminal determines whether to set the to-be-set timer for the application according to the query result, and the performing the corresponding setting operation, further comprising:
   if the terminal determines to refuse creating the to-be-set timer for the application, then transmitting, by the terminal after refusing creating the to-be-set timer for the application, a first notice to the server, so as to notify the server that a creating for the timer at this time has been refused.

4. The method according to claim 1, wherein, if the query result shows that the heartbeat timer list does not comprise the heartbeat timer information entry matched with the query identifier, after the terminal determines to set the to-be-set timer for the application according to the query result, and performs the corresponding setting operation, further comprising:
   monitoring, by the terminal, a correlation between triggering of the to-be-set timer that has been created and transmitting of network data by the application, and determining whether the to-be-set timer belongs to a heartbeat timer according to an associated degree of the correlation;
   if the terminal determines that the to-be-set timer that has been created belongs to the heartbeat timer, then transmitting, by the terminal, a timer storage request to the server according to the first setting information, wherein the timer storage request carries a storage identifier generated according to the first setting information, so as to enable the server to store the to-be-set timer into the heartbeat timer list.

5. A method for setting a heartbeat timer, comprising:
   receiving, by a server, a timer query request transmitted by a terminal, wherein the timer query request carries a query identifier generated by the terminal according to first setting information of a to-be-set timer carried in a timer setting request after receiving the timer setting request transmitted by an application in the terminal;
   querying, by the server, whether a heartbeat timer information entry matched with the query identifier is comprised in a heartbeat timer list according to the query identifier; and transmitting, by the server, a timer query response to the terminal, wherein the timer query response carries a query result indicating whether the heartbeat timer information entry matched with the query identifier is comprised in the heartbeat timer list as queried by the server according to the query identifier, so as to enable the terminal to determine whether to create the to-be-set timer for the application according to the query result.

6. The method according to claim 5, wherein, each heartbeat timer information entry in the heartbeat timer list specifically comprises an application name and a matched string set corresponding to a timer, wherein the matched string set consists of at least one matched string;

the querying, by the server, whether the heartbeat timer information entry matched with the query identifier is comprised in the heartbeat timer list according to the query identifier, comprising:

performing, by the server, a restoration and resolution to the query identifier to acquire the first setting information of the to-be-set timer corresponding to the query identifier;

querying, by the server, whether a heartbeat timer information entry for a same application corresponding to the first setting information is comprised in the heartbeat timer list according to the application name comprised in each heartbeat timer information entry;

if the heartbeat timer list comprises the heartbeat timer information entry for the same application corresponding to the first setting information, then performing, by the server, a calculation on the first setting information according to a preset algorithm to generate a first string;

determining, by the server, a matched string set comprised in the heartbeat timer information entry for the same application corresponding to the first setting information in the heartbeat timer list as a first matched string set, and comparing each of matched strings comprised in the first matched string set with the first string;

if each of the matched strings comprised in the first matched string set are comprised in the first string in sequential order, then determining, by the server, a heartbeat timer information entry corresponding to the first matched string set as the heartbeat timer information entry matched with the query identifier.

7. The method according to claim 5, wherein, each heartbeat timer information entry in the heartbeat timer list also specifically comprises total times that the timer corresponding to the heartbeat timer information entry has been queried by other terminals and "prevent" setting times;

if the heartbeat timer information entry matched with the query identifier is found in the heartbeat timer list by the server according to the query identifier, then the query result comprises the total times that the heartbeat timer information entry matched with the query identifier has been queried by the other terminals and the "prevent" setting times; and after the server transmits the timer query response to the terminal, further comprising:

adding, by the server, one to the total times of being queried by the other terminals in the heartbeat timer information entry matched with the query identifier as comprised in the heartbeat timer list;

receiving, by the server, a first notice transmitted by the terminal, and adding one to the "prevent" setting times in the heartbeat timer information entry matched with a timer marked in the first notice as comprised in the heartbeat timer list according to the first notice.

8. The method according to claim 5, wherein, each heartbeat timer information entry in the heartbeat timer list also specifically comprises total times that the timer corresponding to the heartbeat timer information entry has been queried by other terminals and "prevent" setting times;

if the heartbeat timer information entry matched with the query identifier is not found in the heartbeat timer list by the server according to the query identifier, then the query result is null; and after the server transmits the timer query response to the terminal, further comprising:

receiving, by the server, a timer storage request transmitted by the terminal to the server according to the first setting information, wherein the first setting information is first setting information corresponding to the to-be-set timer which belongs to a heartbeat timer as determined by the terminal through a local identification; and the timer storage request carries a storage identifier generated according to the first setting information; and storing, by the server, the to-be-set timer into the heartbeat timer list according to the storage identifier, so as to provide reference to a setting when another terminal transmits a query request for a same heartbeat timer entry in a future.

9. A terminal, comprising:

a receiver, configured to receive a timer setting request transmitted by an application in a terminal, wherein the timer setting request carries first setting information of a to-be-set timer;

a transmitter, configured to transmit a timer query request to a server according to the first setting information, wherein the timer query request carries a query identifier generated according to the first setting information;

the receiver is further configured to receive a timer query response returned by the server, wherein the timer query response carries a query result indicating whether a heartbeat timer information entry matched with the query identifier is comprised in a heartbeat timer list as queried by the server according to the query identifier; and a processor, configured to determine whether to set the to-be-set timer for the application according to the query result, and perform a corresponding setting operation; wherein the processor is specifically configured to determine whether to create the to-be-set timer for the application according to the query result.

10. The terminal according to claim 9, wherein, if the heartbeat timer information entry matched with the query identifier is found in the heartbeat timer list by the server according to the query identifier, then the query result received by the receiver comprises total times that the heartbeat timer information entry matched with the query identifier has been queried by other terminals and "prevent" setting times; the processor is specifically configured to:

display the query result to a user;

receive an "allow" setting instruction input by the user, and determine to create the to-be-set timer for the application according to the first setting information; or, receive a "refuse" setting instruction input by the user, and determine to refuse creating the to-be-set timer for the application;

or,
if the heartbeat timer information entry matched with the query identifier is not found in the heartbeat timer list by the server according to the query identifier, then the query result received by the receiver is null.

11. The terminal according to claim 9, wherein, the processor is further configured to:
if the query result shows that the heartbeat timer list comprises the heartbeat timer information entry matched with the query identifier, and the processor determines to refuse creating the to-be-set timer for the application, then instruct the transmitter to transmit a first notice to the server so as to notify the server that a creating for the timer at this time has been refused, after the processor refuses creating the to-be-set timer for the application.

12. The terminal according to claim 9, wherein, the processor is further configured to:
if the query result shows that the heartbeat timer list does not comprise the heartbeat timer information entry matched with the query identifier, and after the processor determines to set the to-be-set timer for the application according to the query result and performs the corresponding setting operation, monitor a correlation between triggering of the to-be-set timer that has been created and transmitting of network data by the application, and determine whether the to-be-set timer belongs to a heartbeat timer according to an associated degree of the correlation;
if it is determined that the to-be-set timer that has been created belongs to the heartbeat timer, then the processor instructs the transmitter to transmit a timer storage request to the server according to the first setting information, wherein the timer storage request carries a storage identifier generated according to the first setting information, so as to enable the server to store the to-be-set timer into the heartbeat timer list.

13. A server, comprising:
a receiver, configured to receive a timer query request transmitted by a terminal, wherein the timer query request carries a query identifier generated by the terminal according to first setting information of a to-be-set timer carried in a timer setting request after receiving the timer setting request transmitted by an application in the terminal;
a processor, configured to query whether a heartbeat timer information entry matched with the query identifier is comprised in a heartbeat timer list according to the query identifier; and
a transmitter, configured to transmit a timer query response to the terminal, wherein the timer query response carries a query result indicating whether the heartbeat timer information entry matched with the query identifier is comprised in the heartbeat timer list as queried by the processor according to the query identifier, so as to enable the terminal to determine whether to create the to-be-set timer for the application according to the query result.

14. The server according to claim 13, wherein, each heartbeat timer information entry in the heartbeat timer list specifically comprises an application name and a matched string set corresponding to a timer, wherein the matched string set consists of at least one matched string;
the processor is further configured to:
perform a restoration and resolution to the query identifier to acquire the first setting information of the to-be-set timer corresponding to the query identifier;
query whether a heartbeat timer information entry for a same application corresponding to the first setting information is comprised in the heartbeat timer list according to the application name comprised in each heartbeat timer information entry;
if the heartbeat timer list comprises the heartbeat timer information entry for the same application corresponding to the first setting information, then perform a calculation on the first setting information according to a preset algorithm to generate a first string;
determine a matched string set comprised in the heartbeat timer information entry for the same application corresponding to the first setting information in the heartbeat timer list as a first matched string set, and compare each of matched strings comprised in the first matched string set with the first string;
if each of the matched strings comprised in the first matched string set are comprised in the first string in sequential order, then determine a heartbeat timer information entry corresponding to the first matched string set as the heartbeat timer information entry matched with the query identifier.

15. The server according to claim 13, wherein, each heartbeat timer information entry in the heartbeat timer list also specifically comprises total times that the timer corresponding to the heartbeat timer information entry has been queried by other terminals and "prevent" setting times;
if the heartbeat timer information entry matched with the query identifier is found in the heartbeat timer list by the processor according to the query identifier, then the query result comprises the total times that the heartbeat timer information entry matched with the query identifier has been queried by the other terminals and the "prevent" setting times; and after the transmitter transmits the timer query response to the terminal,
the processor is further configured to add one to the total times of being queried by the other terminals in the heartbeat timer information entry matched with the query identifier as comprised in the heartbeat timer list; the receiver is further configured to receive a first notice transmitted by the terminal, and instruct the processor to add one to the "prevent" setting times in the heartbeat timer information entry matched with a timer marked in the first notice as comprised in the heartbeat timer list according to the first notice.

16. The server according to claim 13, wherein, each heartbeat timer information entry in the heartbeat timer list also specifically comprises total times that the timer corresponding to the heartbeat timer information entry has been queried by other terminals and "prevent" setting times;
if the heartbeat timer information entry matched with the query identifier is not found in the heartbeat list by the processor according to the query identifier, then the query result is null; and after the transmitter transmits the timer query response to the terminal,
the receiver is further configured to receive a timer storage request transmitted by the terminal according to the first setting information, wherein the first setting information is first setting information corresponding to the to-be-set timer which belongs to a heartbeat timer as determined by the terminal through a local identification; and the timer storage request carries a storage identifier generated according to the first setting information; and
the processor is further configured to store the to-be-set timer into the heartbeat timer list according to the storage identifier, so as to provide reference to a setting when another terminal transmits a query request for a same heartbeat timer entry in a future.

* * * * *